(12) United States Patent
Yamazaki et al.

(10) Patent No.: US 10,745,059 B2
(45) Date of Patent: Aug. 18, 2020

(54) SIDE VEHICLE BODY STRUCTURE FOR VEHICLE AND METHOD FOR MANUFACTURING VEHICLE PILLAR MEMBER

(71) Applicant: MAZDA MOTOR CORPORATION, Hiroshima (JP)

(72) Inventors: Tadashi Yamazaki, Hiroshima (JP); Toshiyuki Gendo, Hiroshima (JP); Naoyuki Irie, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 81 days.

(21) Appl. No.: 16/200,966

(22) Filed: Nov. 27, 2018

(65) Prior Publication Data

US 2019/0168812 A1    Jun. 6, 2019

(30) Foreign Application Priority Data

Dec. 4, 2017    (JP) .................................. 2017-232496

(51) Int. Cl.
| | |
|---|---|
| *B62D 25/04* | (2006.01) |
| *B62D 25/06* | (2006.01) |
| *B21D 47/01* | (2006.01) |
| *B62D 21/15* | (2006.01) |
| *B62D 29/00* | (2006.01) |
| *B62D 27/02* | (2006.01) |

(52) U.S. Cl.
CPC ............. *B62D 25/04* (2013.01); *B21D 47/01* (2013.01); *B62D 21/157* (2013.01); *B62D 25/06* (2013.01); *B62D 27/02* (2013.01); *B62D 29/007* (2013.01)

(58) Field of Classification Search
CPC ...... B62D 25/04; B62D 25/06; B62D 21/157; B62D 29/007; B62D 27/02; B21D 47/01
See application file for complete search history.

(56) References Cited

U.S. PATENT DOCUMENTS

| | | | |
|---|---|---|---|
| 2014/0239672 | A1 | 8/2014 | Yajima et al. |
| 2017/0036701 | A1 | 2/2017 | Yamada et al. |

FOREIGN PATENT DOCUMENTS

| | | | |
|---|---|---|---|
| GB | 2497396 | A | 6/2013 |
| JP | 2014-193712 | A | 10/2014 |
| WO | 2011/151962 | A1 | 12/2011 |
| WO | 2012/035662 | A1 | 3/2012 |

*Primary Examiner* — D Glenn Dayoan
*Assistant Examiner* — Melissa Ann Bonifazi
(74) *Attorney, Agent, or Firm* — Studebaker & Brackett PC

(57) ABSTRACT

In a side vehicle body structure for a vehicle, a reinforcing panel includes: a main reinforcing portion disposed so as to extend in a longitudinal direction of a side face portion along a first straight portion, a second straight portion, and a portion of a body panel which connects the first straight portion and the second straight portion; a first upper-end reinforcing portion disposed so as to extend upward toward the front of a vehicle body from an upper edge of the main reinforcing portion along a first curved portion; and a second upper-end reinforcing portion disposed so as to extend upward toward the rear of the vehicle body from the upper edge of the main reinforcing portion along a second curved portion.

7 Claims, 8 Drawing Sheets

SIDE VEHICLE BODY STRUCTURE FOR VEHICLE AND METHOD FOR MANUFACTURING VEHICLE PILLAR MEMBER

CROSS-REFERENCE TO RELATED APPLICATION

This application claims priority to Japanese Patent Application No. 2017-232496 filed on Dec. 4, 2017, the entire disclosure of which is incorporated by reference herein.

BACKGROUND

The present disclosure relates to side vehicle body structure for vehicles which include a pillar member and methods for manufacturing a vehicle pillar member, and belongs to the production engineering field of vehicle bodies.

On each side of a vehicle body for vehicles such as automobiles, a roof side rail extending in the longitudinal direction of the vehicle body along the side of a roof panel and a side sill extending in the longitudinal direction of the vehicle body along the side of a floor panel are sometimes coupled via a center pillar extending in the vertical direction of the vehicle body.

In this type of side vehicle body structure, the center pillar functions to restrain deformation of a roof due to load applied from above the vehicle body (roof crush) and to distribute load applied in the lateral direction of the vehicle body to the roof side rail, the side sill, etc.

The center pillar typically includes an inner pillar member and an outer pillar member which are joined together, and a closed section that is continuous in the vertical direction of the vehicle body is formed between these members. The center pillar can thus effectively perform its various functions.

For example, as disclosed in Japanese Unexamined Patent Publication No. 2014-193712, a pillar member forming a center pillar may be formed by a body panel forming the closed section described above and a reinforcing panel placed on and joined to a part of the body panel. In the pillar member disclosed in Japanese Unexamined Patent Publication No. 2014-193712, the reinforcing panel is disposed on an intermediate part in the longitudinal direction of the body panel in order to improve flexural rigidity of the pillar member.

SUMMARY

In the production engineering field of vehicle bodies, the configuration in which not only the intermediate part in the longitudinal direction of the body panel but also the upper end of the body panel are reinforced by the reinforcing panel has been considered or has been used in practical applications in order to improve roof crush resistance of a pillar member.

Various functions of the sides of the vehicle body including a function to transfer load between the pillar and the roof side rail need to be comprehensively considered in order to specifically consider desired positioning of the reinforcing panel on the body panel.

It is an object of the present disclosure to provide a side vehicle body structure for a vehicle which can effectively perform various functions of a vehicle pillar member including a body panel and a reinforcing panel, and a method for manufacturing a vehicle pillar member.

In order to solve the above problems, the present disclosure is configured as follows.

A first technique disclosed herein is a side vehicle body structure for a vehicle which includes a roof side rail disposed on a side of a vehicle body so as to extend in a longitudinal direction of the vehicle body, and a pillar disposed so as to extend downward in a vertical direction of the vehicle body from the roof side rail and forming a closed section that is continuous in the vertical direction of the vehicle body, wherein the pillar includes a pillar member that has a body panel forming at least a part of the closed section and joined at its upper end to the roof side rail and a reinforcing panel placed on and joined to a part of the body panel, the body panel includes a side face portion extending in the vertical direction of the vehicle body so as to form an outer side face of the closed section in a lateral direction of the vehicle body and coupled at its upper end to the roof side rail, a first ridge portion extending in the vertical direction of the vehicle body along a front edge of the side face portion, and a second ridge portion extending in the vertical direction of the vehicle body along a rear edge of the side face portion, the first ridge portion includes a first straight portion extending straight in a longitudinal direction of the side face portion and a first curved portion extending upward toward front of the vehicle body from an upper end of the first straight portion to an upper end of the first ridge portion, the second ridge portion includes a second straight portion extending straight in the longitudinal direction of the side face portion and a second curved portion extending upward toward rear of the vehicle body from an upper end of the second straight portion to an upper end of the second ridge portion, and the reinforcing panel includes a main reinforcing portion disposed so as to extend in the longitudinal direction of the side face portion along the first straight portion, the second straight portion, and a portion of the body panel which connects the first straight portion and the second straight portion, a first upper-end reinforcing portion disposed so as to extend upward toward the front of the vehicle body from an upper edge of the main reinforcing portion along the first curved portion, and a second upper-end reinforcing portion disposed so as to extend upward toward the rear of the vehicle body from the upper edge of the main reinforcing portion along the second curved portion.

According to a second technique, in the first technique, the reinforcing panel further includes a bridge portion connecting an upper end of the first upper-end reinforcing portion and an upper end of the second upper-end reinforcing portion.

According to a third technique, in the second technique, the reinforcing panel has an opening surrounded by the first upper-end reinforcing portion, the second upper-end reinforcing portion, and the bridge portion, the side face portion of the body panel has a positioning hole that is used when attaching the pillar member to the vehicle body, and the reinforcing panel is placed on the side face portion such that the positioning hole is exposed through the opening.

A fourth technique disclosed herein is a method for manufacturing a vehicle pillar member that is formed by joining a reinforcing panel to a part of a body panel, including: a preparation step of preparing a flat elongated first sheet material as a raw material for the body panel and preparing as a raw material for the reinforcing panel a flat elongated second sheet material having in its one end in a longitudinal direction of the second sheet material a first branch portion and a second branch portion that diverge away from each other toward their tip ends; a joining step of placing the first sheet material and the second sheet material on top of each other such that the first branch portion and the second branch portion are placed on one end in a longitudinal direction of the first sheet material, and joining the first and second sheet materials to form a joined sheet material; and a forming step of press forming the joined sheet material so as to form a first ridge extending in a longitudinal direction of the joined sheet material and extending in the first branch portion and a second ridge extending in the longitudinal direction of the joined sheet material and extending in the second branch portion, thereby forming the vehicle pillar member with a predetermined shape.

According to a fifth technique, in the fourth technique, the method further includes: a hole-forming step of, after the forming step, forming in a predetermined portion of the body panel in the pillar member a positioning hole that is used when attaching the pillar member to the vehicle body, wherein in the preparation step, an opening that exposes the predetermined portion is formed in a portion of the second sheet material which is placed on the predetermined portion in the joining step.

According to a sixth technique, in the fourth or fifth technique, the method further includes: a heating step of heating the joined sheet material after the joining step and before the forming step.

In the first technique, the first ridge portion and the second ridge portion of the body panel of the pillar member are reinforced by the reinforcing panel at least from intermediate parts in a longitudinal direction of the first and second ridge portions to the upper ends of the first and second ridge portions. This effectively improves flexural rigidity of the pillar member. The function to transfer load from the pillar to the roof side rail and roof crush resistance of the pillar are therefore effectively improved.

An upper end of the reinforcing panel divides into the first upper-end reinforcing portion extending along the first curved portion of the first ridge portion and the second upper-end reinforcing portion extending along the second curved portion of the second ridge portion. Accordingly, load applied in the lateral direction of the vehicle body to the pillar member and transferred to an upper end of the pillar member via the first ridge portion and the second ridge portion can be effectively distributed to front and rear sides of the vehicle body with respect to a joint portion between the roof side rail and the pillar. This reduces a stress concentration in the joint portion between the roof side rail and the pillar and thus restrains deformation of the roof side rail in the joint portion. The function to distribute load from the pillar to parts of the vehicle body via the roof side rail is therefore improved.

In the second technique, the upper end of the first upper-end reinforcing portion and the upper end of the second upper-end reinforcing portion in the reinforcing panel are connected via the bridge portion. This improves surface rigidity of the upper end of the pillar member. The roof crush resistance of the pillar and the function to transfer load from the pillar to the roof side rail are therefore more effectively improved.

In the third technique, the pillar member is configured so that the positioning hole formed in the side face portion of the body panel is exposed through the opening in the reinforcing panel. Accordingly, in the case where the joining step of joining the reinforcing panel having the opening formed therein to the body panel, the forming step of press forming these panels together, and the hole-forming step of forming the positioning hole in the pillar member are performed in this order to manufacture such a pillar member, a hole need be formed only in the body panel through the opening in the reinforcing panel in the hole-forming step. The positioning hole can thus be more easily and accurately formed as compared to the case where a hole is formed in a portion where the body panel and the reinforcing panel overlap each other.

In the vehicle pillar member manufactured by the method of the fourth technique, the first ridge and the second ridge extending in a longitudinal direction of the vehicle pillar member are formed so that one ends of the first and second ridges extend in the two branch portions of the reinforcing panel. By joining one end of the pillar member to the roof side rail, the first and second ridges are reinforced by the reinforcing panel at least from intermediate parts in the longitudinal direction of the first and second ridges to upper ends of the first and second ridges. This effectively improves flexural rigidity of the pillar member. The function to transfer load from the pillar to the roof side rail and roof crush resistance of the pillar are therefore effectively improved.

In the upper end of the pillar member, the first ridge and the second ridge are reinforced by the two branch portions of the reinforcing panel. Accordingly, load applied in the lateral direction of the vehicle body to the pillar member and transferred to the upper end of the pillar member via the first ridge and the second ridge can be effectively distributed to the front and rear sides of the vehicle body with respect to the joint portion between the roof side rail and the pillar. This reduces a stress concentration in the joint portion between the roof side rail and the pillar and thus restrains deformation of the roof side rail in the joint portion. The function to distribute load from the pillar to the parts of the vehicle body via the roof side rail is therefore improved.

In the fifth technique, the opening is formed in advance in the reinforcing panel in the preparation step. Accordingly, when forming the positioning hole in the hole-forming step after the forming step, the hole need be formed only in the body panel through the opening in the reinforcing panel. The positioning hole can thus be more easily and accurately formed as compared to the case where a hole is formed in the portion where the body panel and the reinforcing panel overlap each other.

In the sixth technique, even when high tensile steel sheets with poor cold formability etc. are used as the first and second sheet materials, formability of the joined sheet material formed by joining these sheet materials in the joining step is improved by the heating step, and the forming step is performed on the joined sheet material having improved formability. The pillar member can thus be accurately formed.

DETAILED DESCRIPTION

Figure 1:
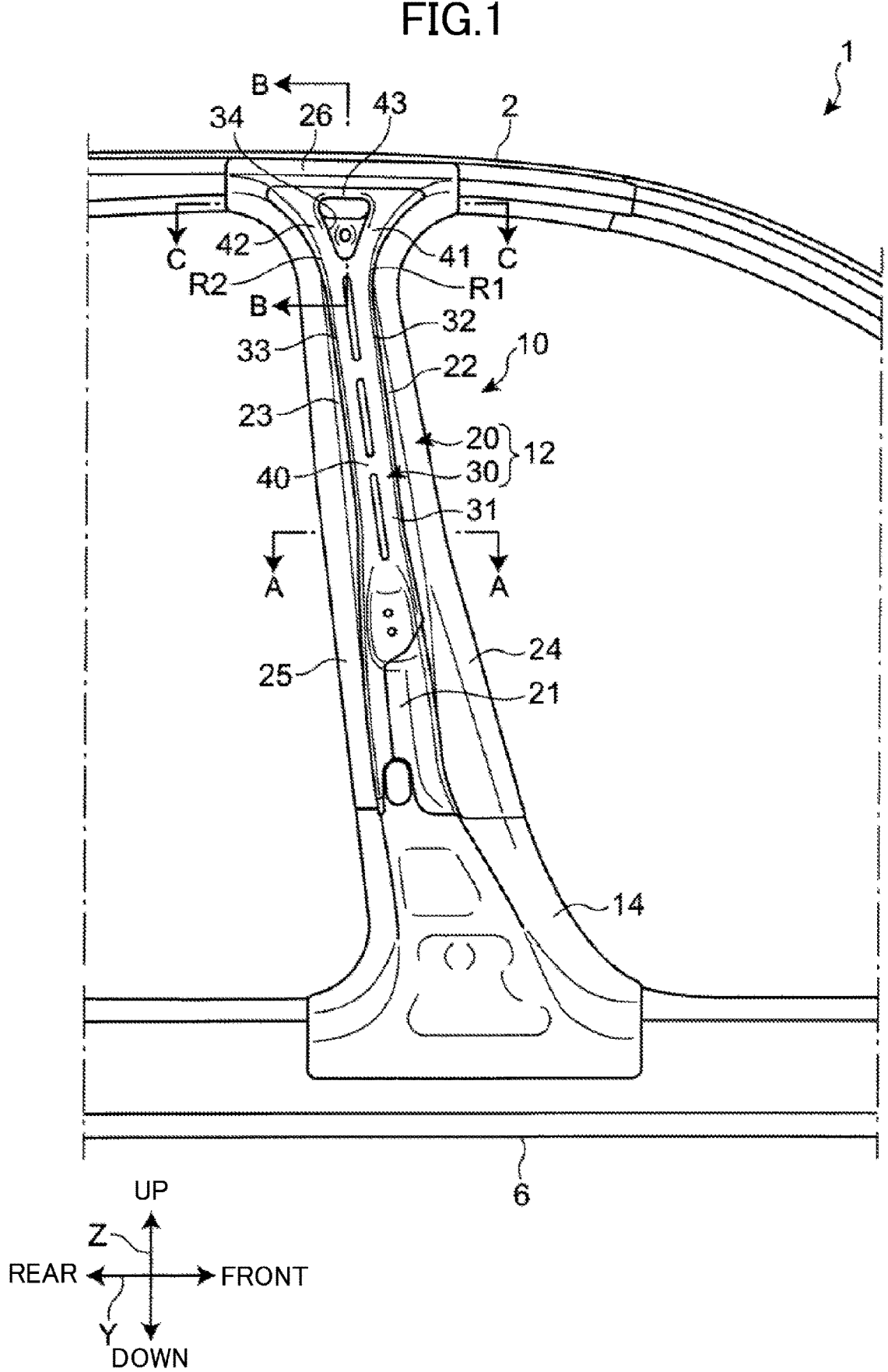
FIG. 1 is a side view of a side vehicle body structure for a vehicle according to an embodiment of the present disclosure.

A side vehicle body structure according to an embodiment of the present disclosure will be described with reference to the accompanying drawings. In the following description, the terms describing directions such as "front," "rear," "right," "left," "upper," and "lower" refer to the directions of a vehicle body in the case where the traveling direction of a vehicle at the time the vehicle travels forward is defined as "forward," unless otherwise specified. In the drawings, "X" represents the lateral direction of the vehicle body, "Y" represents the longitudinal direction of the vehicle body, and "Z" represents the vertical direction of the vehicle body.

General Configuration

Figure 2:
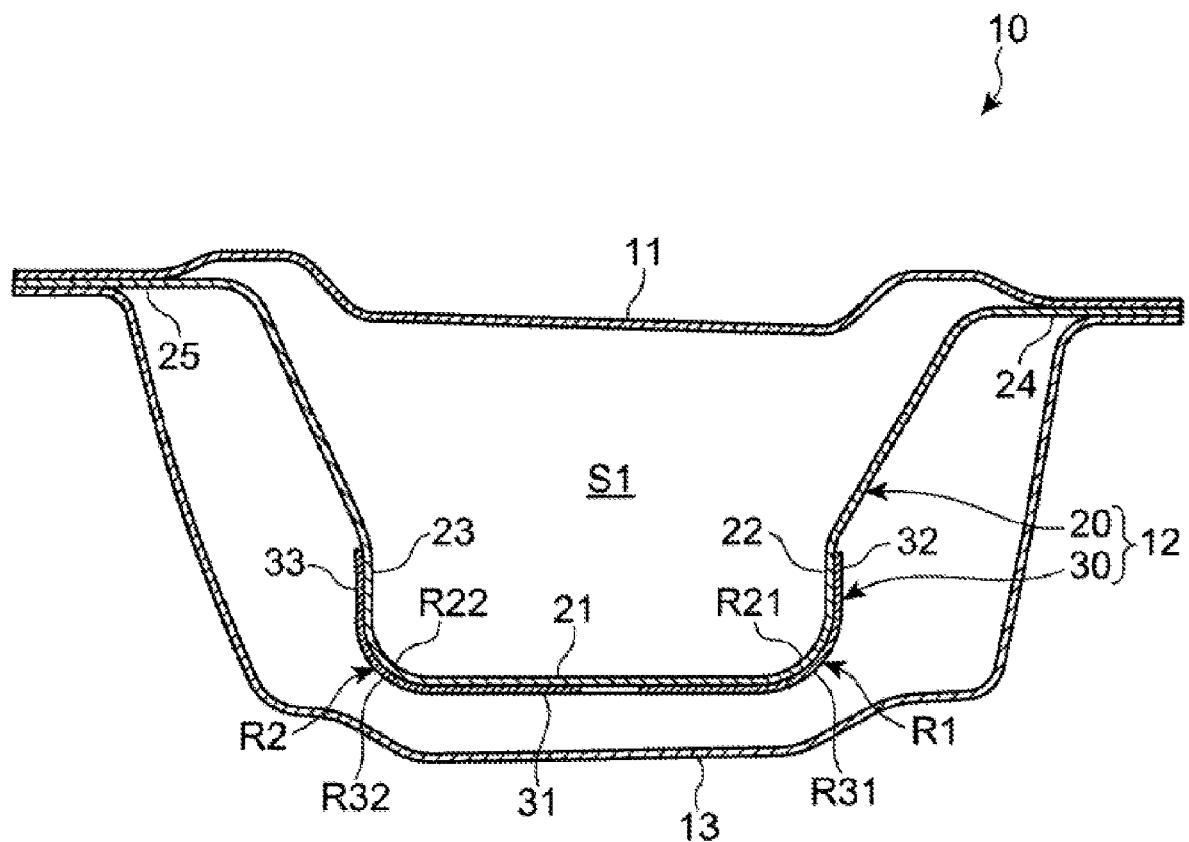
FIG. 2 is a sectional view taken along line A-A in FIG. 1, showing a sectional shape of a center pillar.
Figure 2:
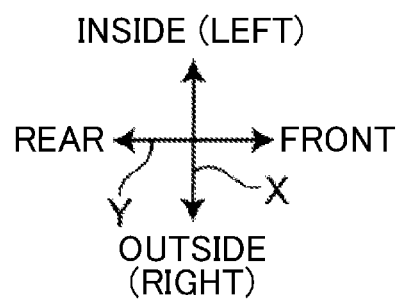
Figure 3:
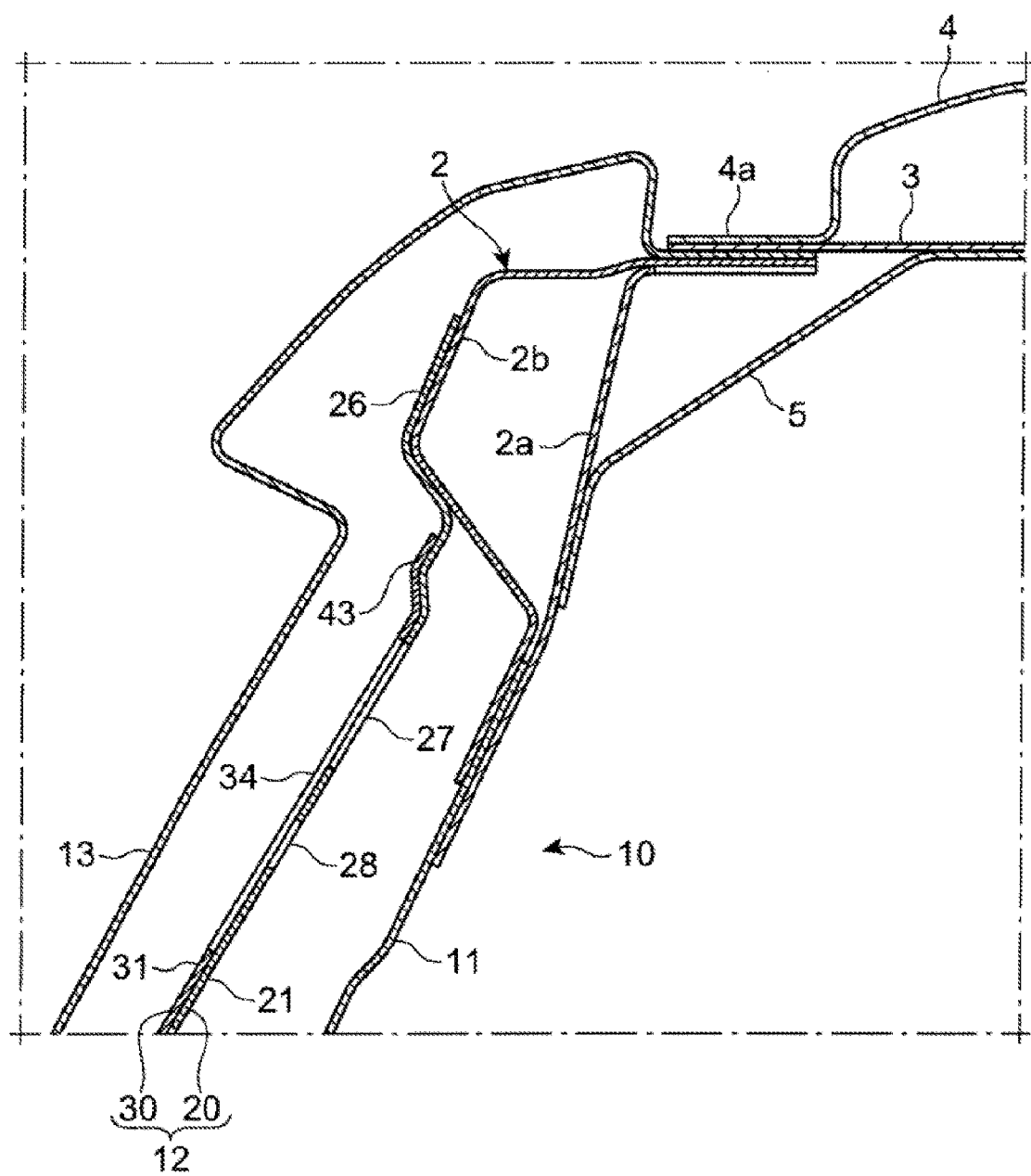
FIG. 3 is a sectional view taken along line B-B in FIG. 1, showing the upper end and its surrounding region of the center pillar as viewed from the front of a vehicle body.
Figure 4:
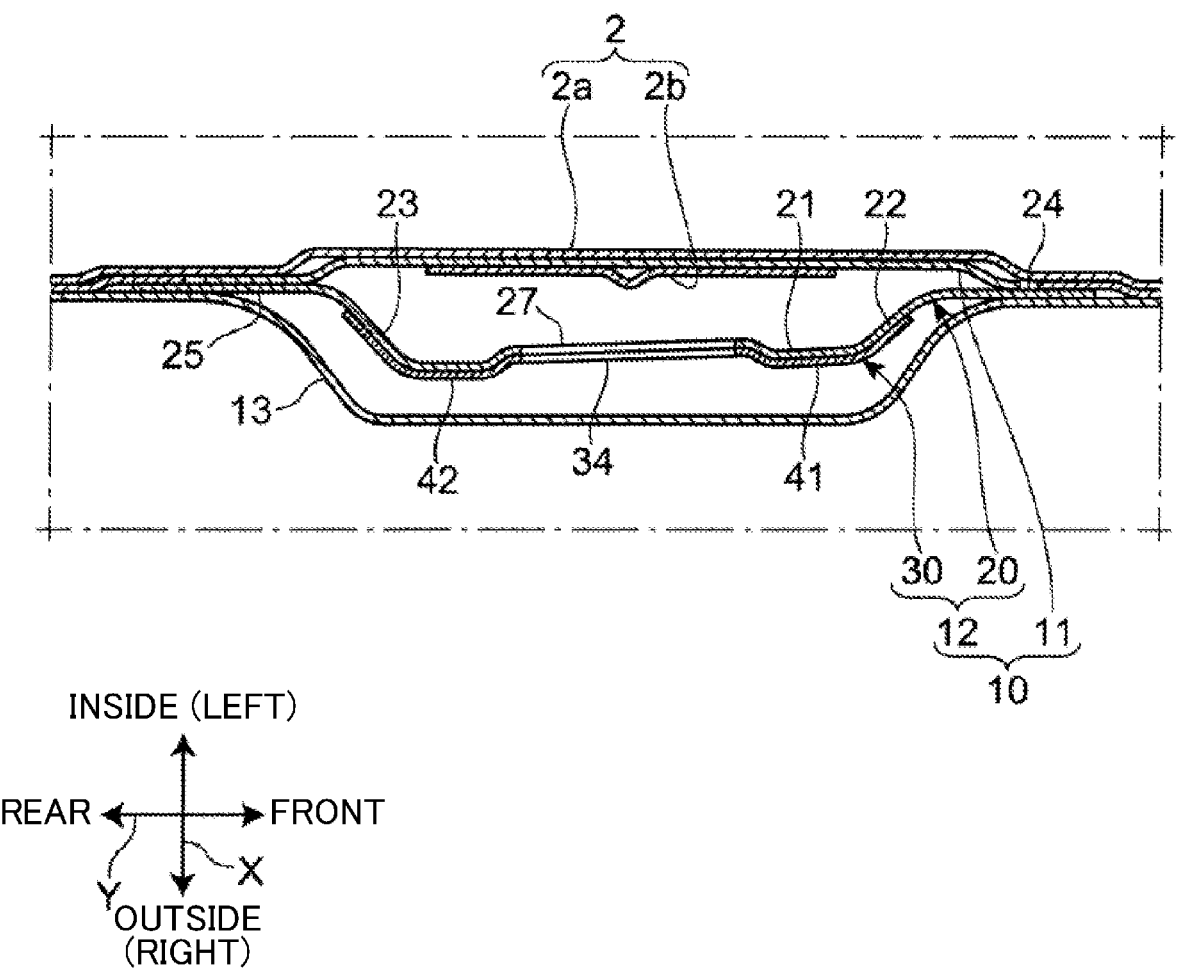
FIG. 4 is a sectional view taken along line C-C in FIG. 1, showing the upper end and its surrounding region of the center pillar as viewed from above the vehicle body.

FIG. 1 is a side view showing a part of an automobile 1 including a side vehicle body structure for a vehicle according to an embodiment of the present disclosure. In order to facilitate understanding of the invention, a pillar garnish exposed to the outside of a passenger compartment is not shown in FIG. 1. FIG. 2 is a sectional view taken along line A-A in FIG. 1, FIG. 3 is a sectional view taken along line B-B in FIG. 1, and FIG. 4 is a sectional view taken along line C-C in FIG. 1.

As shown in FIG. 1, a roof side rail 2, a side sill 6, and a center pillar 10 are disposed on the side of a body of the automobile 1. The roof side rail 2 extends in the longitudinal direction Y of the body along the side of a roof panel 4 (see FIG. 3). The side sill 6 extends in the longitudinal direction of the body along the side of a floor panel (not shown). The center pillar 10 is disposed so as to extend in the vertical direction Z of the body and couples the roof side rail 2 and the side sill 6.

As shown in the sectional view of FIG. 2, the center pillar 10 includes an inner pillar member 11 and an outer pillar member 12 which are joined together. The inner pillar member 11 and the outer pillar member 12 are elongated members extending in the vertical direction Z of the body.

The inner pillar member 11 has a generally flat sectional shape as viewed in the vertical direction Z of the body. The outer pillar member 12 is disposed on the outer side of the inner pillar member 11 in the lateral direction X of the body. The outer pillar member 12 is joined along its front and rear edges to the inner pillar member 11. A closed section S1 that is continuous in the vertical direction Z of the body is thus formed between the inner pillar member 11 and the outer pillar member 12.

An outer panel 13, which is a pillar garnish, covers the outer pillar member 12 from the outside in the lateral direction X of the body. The outer panel 13 together with the outer pillar member 12 is joined along its front and rear edges to the inner pillar member 11. The outer panel 13 is not shown in FIG. 1.

As shown in the sectional view of FIG. 3, the roof side rail 2 includes an inner rail member 2a and an outer rail member 2b. The outer rail member 2b is disposed on the outer side of the inner rail member 2a in the lateral direction X of the body so as to face the inner rail member 2a. The inner rail member 2a and the outer rail member 2b are joined along their upper edges and lower edges by, e.g., welding. A closed section that is continuous in the longitudinal direction Y of the body is thus formed between the inner rail member 2a and the outer rail member 2b.

In the joint portion between the center pillar 10 and the roof side rail 2, an upper flange portion 26 in the upper edge of the outer pillar member 12 is joined to a side face portion of the outer rail member 2b by, e.g., welding. As shown in FIGS. 3 and 4, in the joint portion between the center pillar 10 and the roof side rail 2, the upper edge of the inner pillar member 11 is joined to both the lower edge of the inner rail member 2a and the lower edge of the outer rail member 2b.

As shown in FIG. 3, the roof panel 4 has a stepped portion 4a along its side edge, and a groove-like "Mohican" portion extending in the longitudinal direction Y of the body is formed in the stepped portion 4a. The roof panel 4 is supported from below in the vertical direction Z of the body by a plurality of roof reinforcing members 3 extending in the lateral direction X of the body. The upper edge of the inner rail member 2a and the upper edge of the outer rail member 2b are joined to the stepped portion 4a of the roof panel 4 and the side edges of the roof reinforcing members 3.

The joint portion between the center pillar 10 and the rood side rail 2 is coupled to the roof reinforcing member 3 via a roof gusset 5. The roof gusset 5 is disposed so as to extend obliquely upward in the vertical direction Z of the body toward the inside in the lateral direction X of the body. The upper edge of the roof gusset 5 is joined to the lower surface of the roof reinforcing member 3, and the lower edge of the roof gusset 5 is joined to the inner side surface of the inner rail member 2a which faces the passenger compartment. This configuration achieves smooth load transfer between the center pillar 10 and the roof reinforcing member 3 via the roof gusset 5.

Outer Pillar Member

Figure 5:
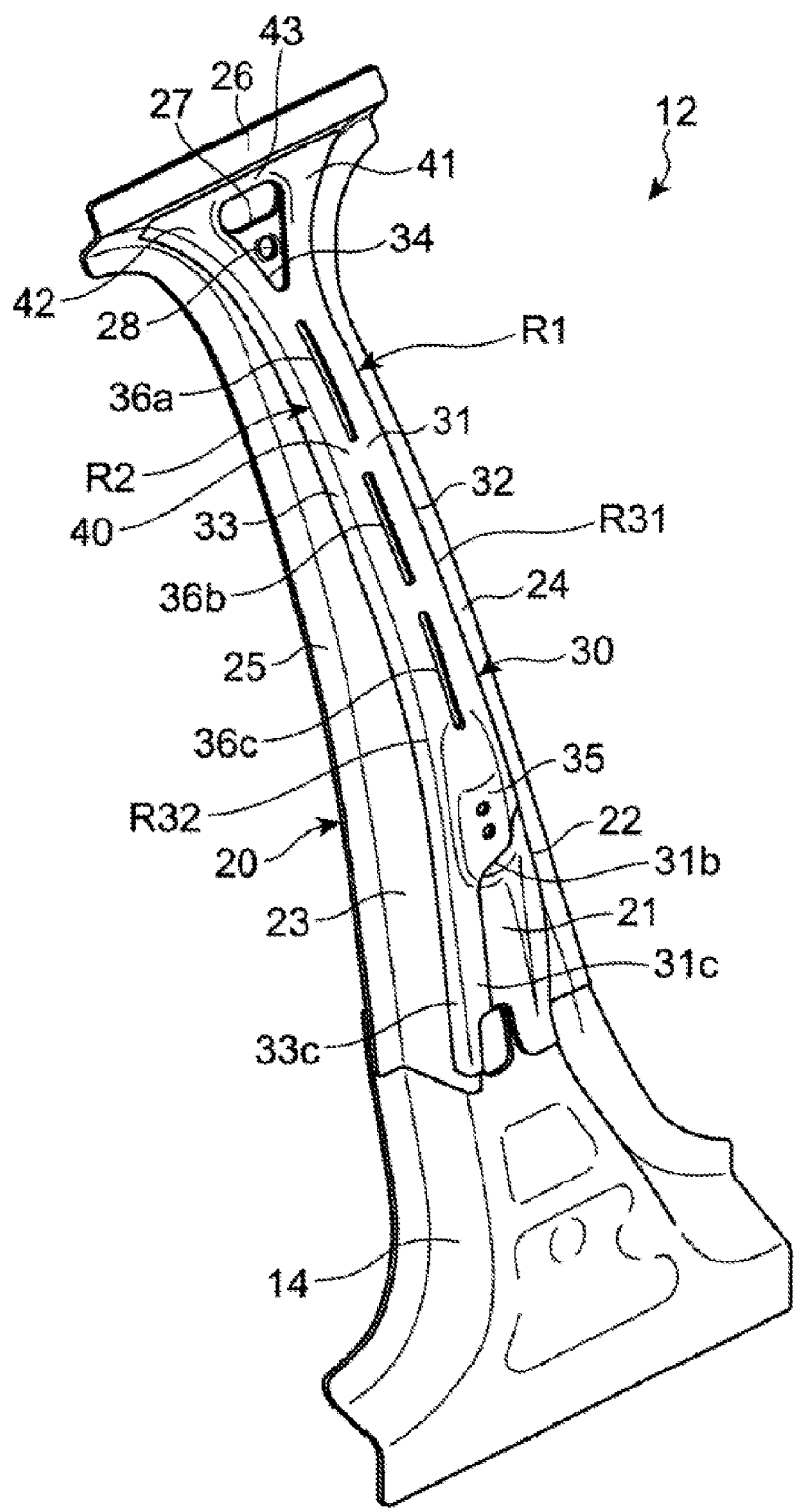
FIG. 5 is a perspective view of an outer pillar member.

As shown in FIGS. 2 and 5, the outer pillar member 12 includes a pillar body panel 20 and a pillar reinforcing panel 30. The pillar body panel 20 is an elongated member extending in the vertical direction Z of the body. The pillar reinforcing panel 30 reinforces the pillar body panel 20. The outer pillar member 12 further includes a lower extension panel 14 connected to the lower end of the pillar body panel 20. However, the lower extension panel 14 may be integral with the pillar body panel 20. The pillar body panel 20, the pillar reinforcing panel 30, and the lower extension panel 14 are made of, e.g., a steel sheet such as a high tensile steel sheet.

The outer pillar member 12 is generally formed with a hat-shaped section that opens inward in the lateral direction X of the body. The outer pillar member 12 thus has a first ridge R1 and a second ridge R2 on its outer side face in the lateral direction X of the body. The first ridge R1 and the second ridge R2 extend in the longitudinal direction of the outer pillar member 12. The first ridge R1 has a curved upper end that extends obliquely upward toward the front such that its tip end is located closest to the front. The second ridge R2 has a curved upper end that extends obliquely upward toward the rear such that its tip end is located closest to the rear.

The pillar body panel 20 includes a side face portion 21, a front face portion 22, a rear face portion 23, a front flange portion 24, and a rear flange portion 25. The side face portion 21 faces the outer side of the inner pillar member 11 in the lateral direction X of the body. The front face portion 22 extends inward in the lateral direction X of the body from the front edge of the side face portion 21. The rear face portion 23 extends inward in the lateral direction X of the body from the rear edge of the side face portion 21. The front flange portion 24 extends toward the front of the body from the inner edge of the front face portion 22 in the lateral direction X of the body. The rear flange portion 25 extends toward the rear of the body from the inner edge of the rear face portion 23 in the lateral direction X of the body.

As shown in FIG. 2, the pillar body panel 20 is a member with a hat-shaped section that opens inward in the lateral direction X of the body. The pillar body panel 20 is joined along the front and rear flange portions 24, 25 to the inner pillar member 11 by, e.g., welding. The closed section S1 is thus formed between the pillar body member 20 and the inner pillar member 11.

As shown in FIG. 5, the side face portion 21, the front face portion 22, the rear face portion 23, the front flange portion 24, and the rear flange portion 25 of the pillar body member 20 are walls extending along substantially the entire length of the pillar body panel 20. The pillar body panel 20 further includes the upper flange portion 26 in its upper end. The upper flange portion 26 extends in the longitudinal direction Y of the body along the upper edge of the side face portion 21. The upper flange portion 26 is joined to the outer side face of the roof side rail 2 in the lateral direction X of the body by, e.g., welding (see FIG. 1). The pillar body panel 20 further has an assembly opening 27 and a positioning hole 28 near the upper end of the side face portion 21. The assembly opening 27 and the positioning hole 28 are used when attaching the outer pillar member 12 to the body.

As shown in FIG. 2, the pillar body panel 20 has a first ridge portion R21 along the front edge of the side face portion 21, namely in the corner between the side face portion 21 and the front face portion 22, and a second ridge portion R22 along the rear edge of the side face portion 21, namely in the corner between the side face portion 21 and the rear face portion 23. The first ridge portion R21 extends in the vertical direction Z of the body so as to form the first ridge R1, and the ridge portion R2 extends in the vertical direction Z of the body so as to form the second ridge R2.

As shown in FIGS. 2 and 5, the pillar reinforcing panel 30 is placed on the outer surface of the pillar body panel 20 as viewed from the passenger compartment. The pillar reinforcing panel 30 is joined to the pillar body panel 20 by welding.

The pillar reinforcing panel 30 includes a side-face reinforcing portion 31, a front-face reinforcing portion 32, and a rear-face reinforcing portion 33. The side-face reinforcing portion 31 is placed on the side face portion 21 of the pillar body panel 20, the front-face reinforcing portion 32 is placed on the front face portion 22 of the pillar body panel 20, and the rear-face reinforcing portion 33 is placed on the rear face portion 23 of the pillar body panel 20. The front-face reinforcing portion 32 extends inward in the lateral direction X of the body from the front edge of the side-face reinforcing portion 31. The rear-face reinforcing portion 33 extends inward in the lateral direction X of the body from the rear edge of the side-face reinforcing portion 31. The pillar reinforcing panel 30 thus has a U-shaped section that opens inward in the lateral direction X of the body.

The pillar reinforcing panel 30 has a ridge portion R31 in the corner between the side-face reinforcing portion 31 and the front-face reinforcing portion 32, and a ridge portion R32 in the corner between the side-face reinforcing portion 31 and the rear-face reinforcing portion 33. The ridge portion R31 extends in the vertical direction Z of the body and is placed on the first ridge portion R21 of the pillar body panel 20. The ridge portion R32 also extends in the vertical direction Z of the body and is placed on the second ridge portion R22 of the pillar body panel 20.

The pillar reinforcing panel 30 is thus placed on a part of the pillar body panel 20 which includes the first and second ridge portions R21, R22, whereby the first and second ridge portions R21, R22 are effectively reinforced.

As shown in FIG. 5, the side-face reinforcing portion 31 is a long wall extending substantially from the upper end of the side face portion 21 to a position lower than the middle of the side face portion 21 in the longitudinal direction of the pillar body panel 20 so as to connect the two ridge portions R31, R32. The front-face reinforcing portion 32 and the rear-face reinforcing portion 33 are also long walls extending in the longitudinal direction of the pillar body panel 20 so as to correspond to the side-face reinforcing portion 31.

The pillar reinforcing panel 30 has in the lower end of the side-face reinforcing portion 31 a fixed portion 35 to which a door hinge for a rear seat door (not shown) is fixed. The pillar reinforcing panel 30 further has in its lower end a side-face extended portion 31c and a rear-face extended portion 33c which extend along the second ridge R2. The side-face extended portion 31c is an extension of the side-face reinforcing portion 31 which is extended downward in the vertical direction Z of the body beyond a lower edge 31b of the fixed portion 35. The rear-face extended portion 33c is an extension of the rear-face reinforcing portion 33 which is extended downward in the vertical direction Z of the body beyond the fixed portion 35.

The side-face reinforcing portion 31 has in its upper end an opening 34 having the shape of, e.g., an inverted triangle. The opening 34 is formed at a position corresponding to the assembly opening 27 and the positioning hole 28 of the pillar body panel 20. The assembly opening 27 and the positioning hole 28 are thus exposed without being covered by the pillar reinforcing panel 30.

The side-face reinforcing portion 31 has slots 36 (36a, 36b, 36c) extending in the longitudinal direction of the outer pillar member 12. The plurality of slots 36a, 36b, 36c are formed at intervals in the longitudinal direction of the outer pillar member 12. The slots 36a, 36b, 36c are formed between the opening 34 and the fixed portion 35 in the longitudinal direction of the outer pillar member 12. Each slot 36 is located substantially in the middle in the lateral direction of the side-face reinforcing portion 31.

Ridge Portions of Pillar Body Panel

Figure 6:
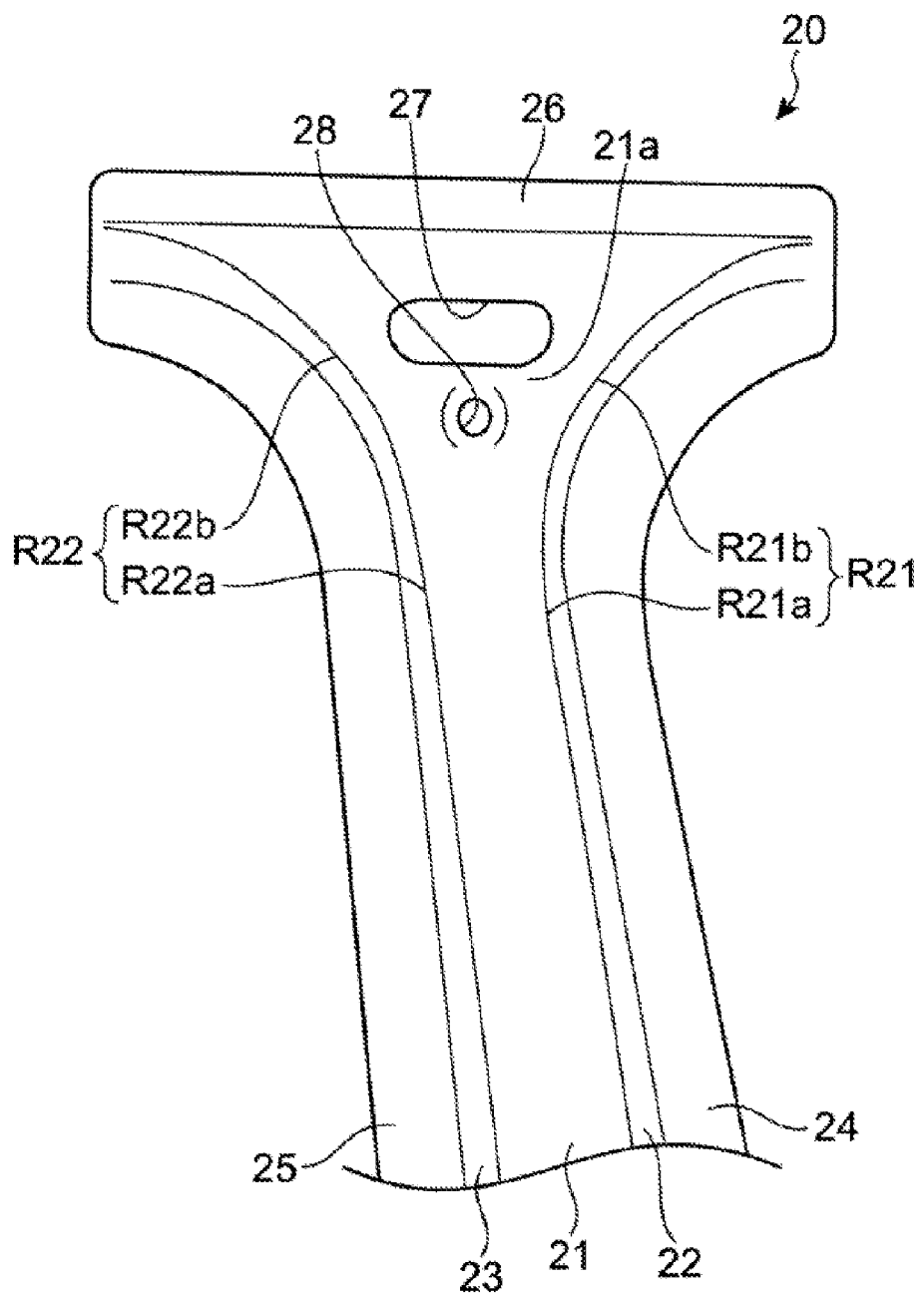
FIG. 6 is a side view showing a part of a body panel of the outer pillar member.

As shown in the side view of FIG. 6, the side face portion 21 of the pillar body panel 20 has an upper end 21a having substantially the shape of an inverted triangle that is widened in the shape of a trumpet bell toward its tip end. The upper ends of the first and second ridge portions R21, R22 have a curved shape that conforms to the shape of the upper end 21a of the side face portion 21.

That is, the first ridge portion R21 includes a first straight portion R21a and a first curved portion R21b. The first straight portion R21a extends straight in the longitudinal direction of the side face portion 21. The first curved portion R21b extends upward toward the front of the body from the upper end of the first straight portion R21a to the upper end of the first ridge portion R21. The second ridge portion R22 includes a second straight portion R22a and a second curved portion R22b. The second straight portion R22a extends straight in the longitudinal direction of the side face portion 21. The second curved portion R22b extends upward toward the rear of the body from the upper end of the second straight portion R22a to the upper end of the second ridge portion R22.

Ridge Portions of Pillar Reinforcing Panel

Figure 7:
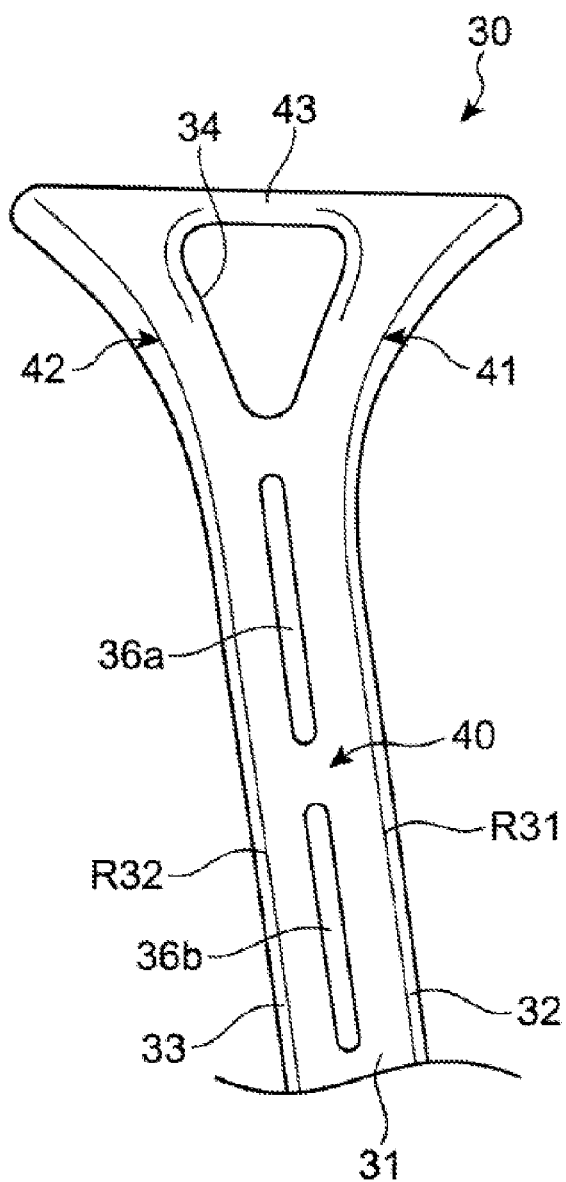
FIG. 7 is a side view showing a part of a reinforcing panel of the outer pillar member.

As shown in the side view of FIG. 7, the upper ends of the ridge portions R31, R32 of the pillar reinforcing panel 30 also have a curved shape like the first and second ridge portions R21, R22 of the pillar body panel 20.

The pillar reinforcing panel 30 includes a main reinforcing portion 40. The main reinforcing portion 40 is disposed so as to extend in the longitudinal direction of the side face portion 21 along the first and second straight portions R21a, R22a of the pillar body panel 20 and along a part of the side face portion 21 which connects the first and second straight portions R21a, R22a.

The pillar reinforcing panel 30 further includes a first upper-end reinforcing portion 41, a second upper-end reinforcing portion 42, and a bridge portion 43. The first upper-end reinforcing portion 41 is disposed so as to extend upward toward the front of the body from the upper edge of the main reinforcing portion 40 along the first curved portion R21b. The second upper-end reinforcing portion 42 is disposed so as to extend upward toward the rear of the body from the upper edge of the main reinforcing portion 40 along the second curved portion R22b. The bridge portion 43 connects the upper end of the first upper-end reinforcing portion 41 and the upper end of the second upper-end reinforcing portion 42.

The pillar reinforcing panel 30 thus has the opening 34 in the shape of an inverted triangle, which is surrounded by the first upper-end reinforcing portion 41, the second upper-end reinforcing portion 42, and the bridge portion 43. The pillar reinforcing panel 30 is placed on the side face portion 21 such that the assembly opening 27 and the positioning hole 28 in the side face portion 21 of the pillar body panel 20 are exposed through the opening 34 (see FIG. 5).

Manufacture of Outer Pillar Member

An example of a method for manufacturing the outer pillar member 12 will be described with reference to FIG. 8.

Figure 8:
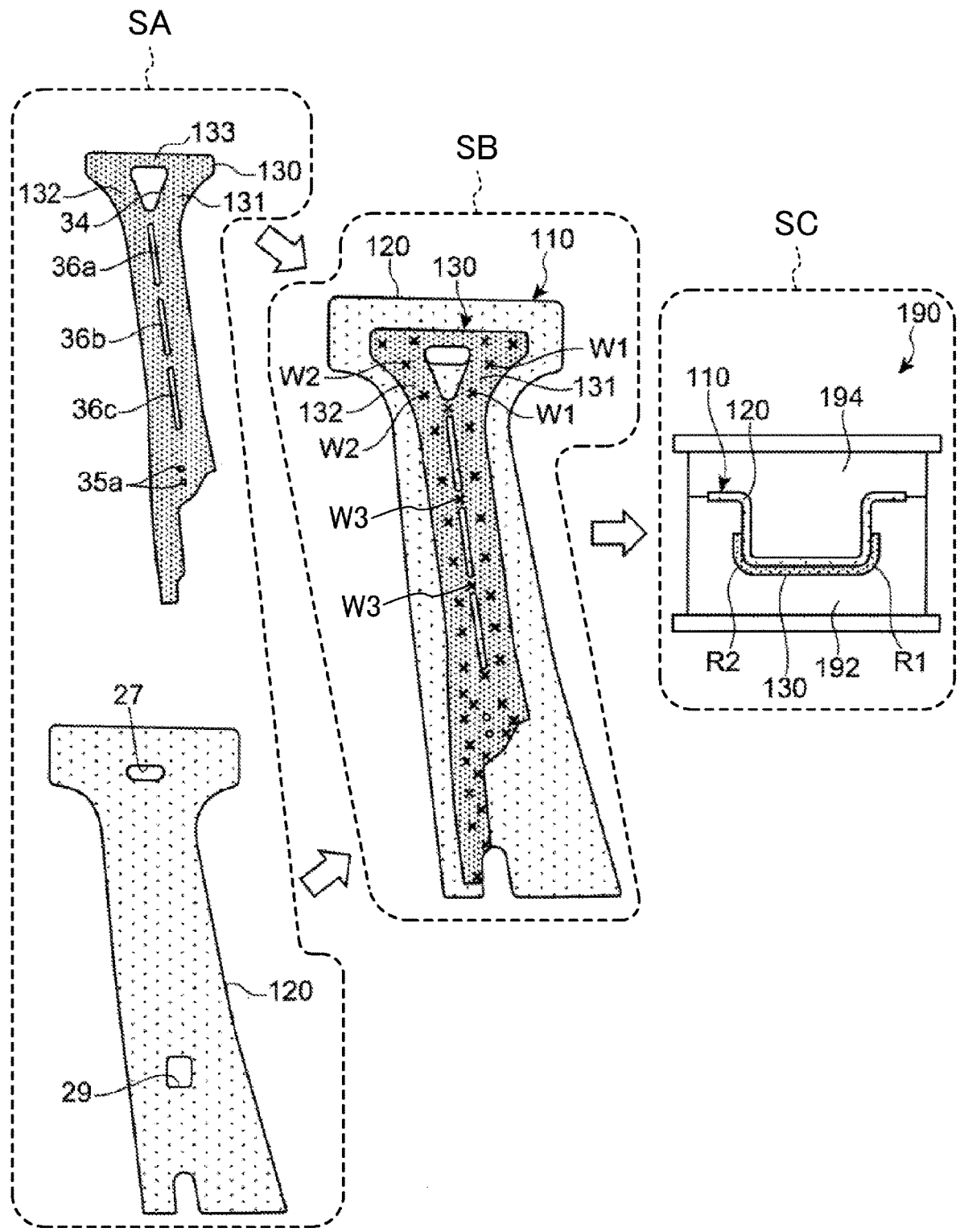
FIG. 8 is a diagram illustrating a manufacturing process of the outer pillar member.

The outer pillar member 12 is manufactured through a preparation process shown by SA in FIG. 8, a joining process shown by SB in FIG. 8, a heating process, a forming process shown by SC in FIG. 8, and a hole-forming process.

In the preparation process shown by SA in FIG. 8, a first sheet material 120 and a second sheet material 130 are prepared as a raw material for the pillar body member 20 and a raw material for the pillar reinforcing member 30, respectively. Although an additional sheet material is also prepared as a raw material for the lower extension panel 14 (see FIG. 5) in the preparation process, this sheet material is not shown in FIG. 8 and description thereof will be omitted.

In the preparation process, flat sheet materials sheared into predetermined elongated shapes by a press machine are prepared as the first sheet material 120 and the second sheet material 130. More specifically, the first sheet material 120 having an assembly opening 27 in a portion corresponding to the side face portion 21 and having an opening 129 at a position corresponding to the fixed portion 35 of the pillar reinforcing panel 30 is prepared in the preparation process.

The second sheet material 130 includes a first branch portion 131, a second branch portion 132, and a connection portion 133 in its one end in the longitudinal direction of the second sheet material 130. The first branch portion 131 and the second branch portion 132 diverge away from each other toward their tip ends. The connection portion 133 connects the tip end of the first branch portion 131 and the tip end of the second branch portion 132. The first branch portion 131 is a portion that forms the first upper-end reinforcing portion 41 (see FIG. 7), the second branch portion 132 is a portion that forms the second upper-end reinforcing portion 42 (see FIG. 7), and the connection portion 133 is a portion that forms the bridge portion 43 (see FIG. 7).

The second sheet material 130 prepared in the preparation process has an opening 34 surrounded by the first branch portion 131, the second branch portion 132, and the connection portion 133, slots 36a, 36b, 36c, and bolt holes 35a of the fixed portion 35 in a portion corresponding to the side-face reinforcing portion 31.

In the joining process shown by SB in FIG. 8, the second sheet material 130 is placed on a predetermined position of the first sheet material 120, and the first sheet material 120 and the second sheet material 130 are joined at a plurality of points by spot welding. The first sheet material 120 and the second sheet material 130 are positioned and joined such that the longitudinal direction of the first sheet material 120 matches that of the second sheet material 130 and that the first branch portion 131, the second branch portion 132, and the connection portion 133 are placed on one end in the longitudinal direction of the first sheet material 120. A joined sheet material 110 formed by joining the first and second sheet materials 120, 130 is formed in this manner.

Although the sheet material as a raw material for the lower extension member 14 (see FIG. 5) is also joined to the first sheet material 120 in the joining process and forms a part of the joined sheet material 110, this sheet material is not shown in FIG. 4 and description thereof will be omitted.

The joints in the joined sheet material 110 include a plurality of first joints W1 located on one side of the slots 36a, 36b, 36c in the lateral direction (width direction) of the joined sheet material 110, a plurality of second joints W2 located on the other side of the slots 36a, 36b, 36c in the lateral direction (width direction) of the joined sheet material 110, and third joints W3 each located between adjacent ones of the slots 36a, 36b, 36c in the longitudinal direction of the joined sheet material 110.

In the joining process, the first branch portion 131 is spot-welded to the first sheet material 120 at a plurality of the first joints W1 located at intervals in the longitudinal direction of the first branch portion 131, and the second branch portion 131 is spot-welded to the first sheet material 120 at a plurality of the second joints W2 located at intervals in the longitudinal direction of the second branch portion 132.

After the joining process is completed, the heating process of heating the joined sheet material 110 is performed, and hot press forming is performed with a press machine 190 in the forming process shown by SC in FIG. 8. In the heating process, the joined sheet material 110 is softened by heating to a predetermined temperature (e.g., about 900° C.). Formability of the joined sheet material 110 is thus improved. Since the forming process is performed on the joined sheet material 110 having improved formability, the joined sheet material 110 can be accurately formed into a predetermined three-dimensional shape. This method reduces the possibility of unsatisfactory dimensional accuracy due to springback etc. even when high tensile steel sheets with poor cold formability are used as the first and second sheet materials 120, 130.

In the forming process shown by SC in FIG. 8, the joined sheet material 110 is placed between a die 192 and a punch 194 of the press machine 190 and formed into a predetermined shape. Specifically, the joined sheet material 110 is formed so that the first sheet material 120 has a hat-shaped section and the second sheet material 130 has a U-shaped section. A first ridge R1 and a second ridge R2 which extend in the longitudinal direction of the joined sheet material 110 are formed in the portion where the first sheet material 120 overlaps the second sheet material 130. The first ridge R1 is formed so as to extend in the first branch portion 131 of the second sheet material 130, and the second ridge R2 is formed so as to extend in the second branch portion 132 of the second sheet material 130.

When the forming process is performed, the opening 34 of the second sheet material 130 is located between the first joints W1 in the first branch portion 131 and the second joints W2 in the second branch portion 132 (see SB in FIG. 8). This allows the second sheet material 130 to be deformed such that the opening 34 is slightly widened in the lateral direction of the joined sheet material 110 when the first ridge R1 extending in the first branch portion 131 and the second ridge R2 extending in the second branch portion 132 are formed in the joined sheet material 110 in the forming process.

Accordingly, relative displacement between the first and second sheet materials 120, 130, which is caused by the difference in radius of curvature between the first and second sheet materials 120, 130 along the first ridge R1 and the second ridge R2, is facilitated in the portion between the first and second joints W1, W2. Relative displacement between the sheet materials 120, 130 is therefore restrained in the first joints W1 and the second joints W2. This restrains such deformation of the welds that causes reduction in nugget diameter in a joint surface and thus restrains reduction in bonding strength in the first joints W1 and the second joints W2.

In the forming step, the joined sheet material 100 is cooled by contact with the die 192 and the punch 194. The joined sheet material 100 is thus strengthened by quenching. A high-strength outer pillar member 12 (see FIG. 5) is formed in this manner As described above, when manufacturing the outer pillar member 12, the forming process is performed after the joining process. This improves formability so that the pillar reinforcing member 30 conforms to the shape of the pillar body member 20, and also reduces the number of person-hours required for pressing.

After the forming process is completed, the hole-forming process is performed. In the hole-forming process, a positioning hole 28 (see FIGS. 5 and 6) is formed in a predetermined portion of the joined sheet material 110. The positioning hole 28 is formed in a portion of the first sheet material 120 which overlaps the opening 34 of the second sheet material 130. Since the opening 34 has been formed in advance in the preparation process, the portion of the first sheet material 120 where the positioning hole 28 is to be formed has been exposed through the opening 34 when the hole-forming process is performed.

Accordingly, a hole need be formed only in the first plate material in the hole-forming process. The positioning hole 28 can therefore be more easily and accurately formed as compared to the case where a hole is formed in a portion where the first and second sheet materials 120, 130 overlap each other.

Functions and Effects

According to the present embodiment, as shown in FIG. 5, the region from an intermediate part in the longitudinal direction of the first ridge portion R21 of the pillar body panel 20 to the upper end of the first ridge portion R21 of the pillar body panel 20 and the region along substantially the entire length of the second ridge R22 of the pillar body panel 20 are reinforced by the pillar reinforcing panel 30. This effectively improves flexural rigidity of the outer pillar member 12. The function to transfer load from the center pillar 10 to the roof side rail 2 and roof crush resistance of the center pillar 10 are therefore effectively improved.

As shown in FIG. 7, the upper end of the pillar reinforcing panel 30 divides into the first upper-end reinforcing portion 41 extending along the first curved portion R21b of the first ridge portion R21 (see FIG. 6) and the second upper-end reinforcing portion 42 extending along the second curved portion R22b of the second ridge portion R22 (see FIG. 6).

Accordingly, load applied in the lateral direction X of the body to the center pillar 10 and transferred to the upper end of the center pillar 10 via the first ridge R1 and the second ridge R2 can be effectively distributed to the front and rear sides of the body with respect to the joint portion between the center pillar 10 and the roof side rail 2. This reduces a stress concentration in the joint portion between the center pillar 10 and the roof side rail 2 and thus restrains deformation of the roof side rail 2 in the joint portion. The function to distribute load from the center pillar 10 to the parts of the body via the roof side rail 2 is therefore improved.

In the pillar reinforcing panel 30, the upper end of the first upper-end reinforcing portion 41 and the upper end of the second upper-end reinforcing portion 42 are connected via the bridge portion 43. This improves surface rigidity of the upper end of the outer pillar member 12. The roof crush resistance of the center pillar 10 and the function to transfer load from the center pillar 10 to the roof side rail 2 are therefore more effectively improved.

Although the present disclosure is described with respect to the above embodiment, the present disclosure is not limited to the above embodiment.

For example, the above embodiment is described with respect to the example in which the pillar reinforcing panel 30 is placed on the outer surface of the pillar body panel 20. However, the present disclosure is also applicable to a configuration in which a reinforcing member is placed on the inner surface of a body member.

As described above, according to the present disclosure, a vehicle pillar member having a body panel and a reinforcing panel can effectively perform its various functions. The present disclosure can therefore be suitably used in the manufacturing industry of automobiles having this type of vehicle body member.

What is claimed is:

1. A side vehicle body structure for a vehicle which includes a roof side rail disposed on a side of a vehicle body so as to extend in a longitudinal direction of the vehicle body, and a pillar disposed so as to extend downward in a vertical direction of the vehicle body from the roof side rail and forming a closed section that is continuous in the vertical direction of the vehicle body, wherein the pillar includes a pillar member that has a body panel forming at least a part of the closed section and joined at its upper end to the roof side rail and a reinforcing panel placed on and joined to a part of the body panel, the body panel includes a side face portion extending in the vertical direction of the vehicle body so as to form an outer side face of the closed section in a lateral direction of the vehicle body and coupled at its upper end to the roof side rail, a first ridge portion extending in the vertical direction of the vehicle body along a front edge of the side face portion, and a second ridge portion extending in the vertical direction of the vehicle body along a rear edge of the side face portion, the first ridge portion includes a first straight portion extending straight in a longitudinal direction of the side face portion and a first curved portion extending upward toward front of the vehicle body from an upper end of the first straight portion to an upper end of the first ridge portion, the second ridge portion includes a second straight portion extending straight in the longitudinal direction of the side face portion and a second curved portion extending upward toward rear of the vehicle body from an upper end of the second straight portion to an upper end of the second ridge portion, and the reinforcing panel includes a main reinforcing portion disposed so as to extend in the longitudinal direction of the side face portion along the first straight portion, the second straight portion, and a portion of the body panel which connects the first straight portion and the second straight portion, a first upper-end reinforcing portion disposed so as to extend upward toward the front of the vehicle body from an upper edge of the main reinforcing portion along the first curved portion, and a second upper-end reinforcing portion disposed so as to extend upward toward the rear of the vehicle body from the upper edge of the main reinforcing portion along the second curved portion.

2. The side vehicle body structure of claim 1, wherein the reinforcing panel further includes a bridge portion connecting an upper end of the first upper-end reinforcing portion and an upper end of the second upper-end reinforcing portion.

3. The side vehicle body structure of claim 2, wherein the reinforcing panel has an opening surrounded by the first upper-end reinforcing portion, the second upper-end reinforcing portion, and the bridge portion, the side face portion of the body panel has a positioning hole that is used when attaching the pillar member to the vehicle body, and the reinforcing panel is placed on the side face portion such that the positioning hole is exposed through the opening.

4. A method for manufacturing a vehicle pillar member that is formed by joining a reinforcing panel to a part of a body panel, comprising:

a preparation step of preparing a flat elongated first sheet material as a raw material for the body panel and preparing as a raw material for the reinforcing panel a flat elongated second sheet material having in its one end in a longitudinal direction of the second sheet material a first branch portion and a second branch portion that diverge away from each other toward their tip ends;

a joining step of placing the first sheet material and the second sheet material on top of each other such that the first branch portion and the second branch portion are placed on one end in a longitudinal direction of the first sheet material, and joining the first and second sheet materials to form a joined sheet material; and a forming step of press forming the joined sheet material so as to form a first ridge extending in a longitudinal direction of the joined sheet material and extending in the first branch portion and a second ridge extending in the longitudinal direction of the joined sheet material and extending in the second branch portion, thereby forming the vehicle pillar member with a predetermined shape.

5. The method of claim 4, further comprising:

a hole-forming step of, after the forming step, forming in a predetermined portion of the body panel in the pillar member a positioning hole that is used when attaching the pillar member to the vehicle body, wherein in the preparation step, an opening that exposes the predetermined portion is formed in a portion of the second sheet material which is placed on the predetermined portion in the joining step.

6. The method of claim 4, further comprising:

a heating step of heating the joined sheet material after the joining step and before the forming step.

7. The method of claim 5, further comprising:

a heating step of heating the joined sheet material after the joining step and before the forming step.

* * * * *